US012752334B2

(12) United States Patent
Fiessler et al.

(10) Patent No.: US 12,752,334 B2
(45) Date of Patent: Oct. 6, 2026

(54) BENDING MACHINE AND METHOD FOR OPERATING A BENDING MACHINE

(71) Applicant: Fiessler Elektronik GmbH & Co. KG, Aichwald (DE)

(72) Inventors: Lutz Fiessler, Aichwald (DE); Frank Müller, Plochingen (DE)

(73) Assignee: Fiessler Elektronik GmbH & Co. KG, Aichwald (DE)

( * ) Notice: Subject to any disclaimer, the term of this patent is extended or adjusted under 35 U.S.C. 154(b) by 182 days.

(21) Appl. No.: 18/890,058

(22) Filed: Sep. 19, 2024

(65) Prior Publication Data

US 2025/0091116 A1 Mar. 20, 2025

(51) Int. Cl.
*B21D 55/00* (2006.01)
*B30B 15/28* (2006.01)
*F16P 3/14* (2006.01)

(52) U.S. Cl.
CPC ............ *B21D 55/00* (2013.01); *B30B 15/285* (2013.01); *F16P 3/144* (2013.01)

(58) Field of Classification Search
CPC ......... F16P 3/144; B21D 5/02; B21D 5/0209; B21D 55/00; B30B 15/285
See application file for complete search history.

(56) References Cited

U.S. PATENT DOCUMENTS

2005/0076688 A1 4/2005 Braune et al.
2006/0138310 A1* 6/2006 Krieg ...................... F16P 3/144 250/221
2018/0126682 A1* 5/2018 Fiessler ................. B30B 15/045
2020/0324332 A1* 10/2020 Fiessler ................... F16P 3/144
2021/0039156 A1* 2/2021 Matsuura ............. B21D 5/0209
2022/0395890 A1* 12/2022 Fiessler ................... B30B 15/28

FOREIGN PATENT DOCUMENTS

DE 202018103290 U1 * 9/2019 .............. B21D 5/02
EP 1 387 121 2/2004
EP 1387121 A2 * 2/2004 .............. B21D 5/02
(Continued)

OTHER PUBLICATIONS

Translation of DE-202018103290.*
(Continued)

*Primary Examiner* — Bobby Yeonjin Kim
(74) *Attorney, Agent, or Firm* — HSML P.C.

(57) ABSTRACT

Bending machine with a machine bed including a workpiece table with a workpiece support surface and an upper tool which is linearly movable mounted to the machine bed along a movement axis and which has a bottom edge arranged adjacent to the workpiece support surface. The lower edge and the movement axis define a movement plane which separates a handling space from a workpiece receiving space, in which a first optical safety device is arranged in the handling space and a second optical safety device is arranged in the workpiece receiving space, and with a safety controller to process sensor signals from the optical safety devices and for switching off a drive associated with the upper tool. The safety controller provides a first operating mode, in which only the first sensor signals are processed, and a second operating mode, in which only the second sensor signals are processed.

13 Claims, 4 Drawing Sheets

(56) References Cited

FOREIGN PATENT DOCUMENTS

| | | | | |
|---|---|---|---|---|
| EP | 1 522 784 | | 4/2005 | |
| EP | 1522784 | A1 * | 4/2005 | ................ F16P 3/00 |
| EP | 2 633 925 | | 9/2013 | |
| EP | 2633925 | A1 * | 9/2013 | ............. F16P 3/144 |
| EP | 3 722 651 | | 10/2020 | |

OTHER PUBLICATIONS

Translation of EP-1387121.*
Translation of EP-1522784.*
Translation of EP-2633925.*
Extended European Search Report issued in corresponding European Patent Application No. 23198542.5, Mar. 14, 2024, 9 pages.

* cited by examiner

BENDING MACHINE AND METHOD FOR OPERATING A BENDING MACHINE

This application claims priority to EP 2 319 8542.5, filed Sep. 20, 2023, which is incorporated herein by reference.

The invention relates to a bending machine and a method for operating a bending machine. EP 2 633 925 A1 discloses a bending machine comprising a machine bed having a workpiece table with a workpiece supporting surface, a workpiece holder for securing a workpiece to the workpiece table, and a bending tool that is associated with the workpiece table in a pivotally movable manner and is secured to the machine bed by pivot joints, wherein pivot axes of the pivot joints are aligned concentrically to one another and parallel to the workpiece support surface, and with an optical monitoring device for monitoring a closing movement of the workpiece holder, with an optical transmitter for emitting a control beam and with a receiver for the control beam arranged opposite the transmitter, the transmitter and the receiver being assigned to the pivot joints in such a way that the control beam between transmitter and receiver runs in an envelope cylinder formed around the pivot axis.

BACKGROUND OF THE INVENTION

The object of the invention is to provide a bending machine for the processing of workpieces that have several bending areas with bending lines, which do not have to be aligned parallel to one another.

This task is solved, according to a first aspect of the invention, by means of a bending machine which has a machine bed on which a workpiece table is formed, which has a workpiece supporting surface designed for placing a workpiece on it, and which has an upper tool that is mounted on the machine bed so as to be linearly movable along a movement axis and that has a lower edge arranged adjacent to the workpiece support surface, the lower edge defining with the movement axis a movement plane in which the lower edge is movable between an open position for the upper tool and a closed position for the upper tool, the movement plane separating a handling space, which extends starting from the upper tool in the direction of a front edge of the workpiece support surface, from a workpiece receiving space which extends from the upper tool to a rear edge of the workpiece supporting surface, and wherein a first optical safety device is arranged in the handling space and a second optical safety device is arranged in the workpiece receiving space, and with a safety controller which is designed to process first sensor signals of the first optical safety device and second sensor signals of the second optical safety device, and for switching off a drive associated with the upper tool as a function of the first and/or second sensor signals, wherein the safety controller is designed to switch between a first operating mode, in which only the first sensor signals are processed, and a second operating mode, in which only the second sensor signals are processed.

The bending machine can be designed, for example, as a press brake or as a swivel bending machine.

In the case of a press brake, a linear approach movement of an upper tool takes place with respect to a lower tool assigned to the workpiece table, the upper tool having a lower edge which, when the forming operation is carried out, is the area of the upper tool that first comes into contact with an upper side of the workpiece.

A profiling of the upper tool in a cross-sectional plane oriented transversely to the lower edge of the upper tool corresponds here at least substantially to a workpiece contour which the upper side of the workpiece to be machined has after the execution of the bending operation.

Furthermore, a profiling of the lower tool in the cross-sectional plane aligned transversely to the lower edge of the upper tool corresponds at least essentially to a workpiece contour of an underside of the workpiece to be processed after the bending operation has been carried out. A lower tool of a press brake can also be configured in such a way that an upper side of the lower tool facing the upper tool forms the workpiece table and thus also the workpiece support surface.

In a folding machine, the workpiece is first pressed onto the workpiece receiving surface of the workpiece table by an upper tool designed as a clamping beam. In this case, a lower edge of the upper tool is formed by an edge of the clamping beam, which faces a user of the bending machine when the bending machine is used as intended and is at a minimum distance from the workpiece receiving surface. In a subsequent bending step, a folding beam, which is mounted on the workpiece table so that it can pivot, pivots and bends an end region of the workpiece that extends over the workpiece table around the lower edge of the clamping beam.

On both a press brake and a folding machine, the upper tool presents a potential hazard for the user, since during the approach movement of the upper tool to the workpiece table, a working gap between the tool and the workpiece table narrows and disappears for the execution of the forming process, and this can create a risk of crushing, for example, for the user's fingers or arms.

In order to minimize the risk of crushing a user's body parts, the bending machine has a first optical safety device, a second optical safety device and a safety controller electrically connected to the first optical safety device and the second optical safety device.

The safety controller is designed to process sensor signals from the first optical safety device and the second optical safety device and to switch off a drive associated with the upper tool. For example, it is envisaged that an electromechanical drive mechanism or an electrohydraulic drive mechanism is assigned to the upper tool, so that the safety controller can halt the approach movement between the upper tool and the workpiece table by switching off the electrical supply to the respective drive mechanism, or, if necessary, can cause an opening movement of the upper tool in the opposite direction to the workpiece table.

The first optical safety device and the second optical safety device are arranged in such a way that, when a user enters a defined safety zone, they provide a sensor signal to the safety controller that causes the drive system to switch off. For this purpose, the safety zone is divided into a handling zone and a workpiece receiving zone. In this case, the handling space represents a spatial area, in particular a cuboid volume, which extends from the upper tool towards a front edge of the workpiece support surface and into which the user typically reaches when handling workpieces.

The workpiece receiving space extends from the upper tool in the direction of a rear edge of the workpiece support surface and essentially serves to receive the workpiece, although it cannot be ruled out that the user may also reach into this space and may be a cuboid volume. A boundary between the handling space and the workpiece receiving space is formed by a movement plane, which is defined by the lower edge of the upper tool and a movement axis of the upper tool. Typically, the movement plane is oriented transversely, i.e. at a right angle, to the workpiece support surface, which is usually flat and horizontally oriented.

The movement plane is the plane in which the lower edge of the upper tool is moved when moving the upper tool between an open position and a closed position and is thus typically a plane aligned in a vertical direction. It is preferably provided that the first optical safety device, which is arranged in the handling space has a, in particular horizontal, distance of 10 mm to 20 mm from the movement plane and that the second optical safety device, which is arranged in the workpiece receiving space has a, in particular horizontal, distance of 0 mm to 10 mm from the movement plane.

In order to be able to ensure the processing of differently formed workpieces, the safety controller is designed in such a way that it can be switched between a first operating mode, which is optimized to process to a first workpiece configuration, and a second operating mode, which is optimized to process a second workpiece configuration.

In the first operating mode, a first workpiece configuration is assumed in which the workpiece rests on the workpiece support surface with an underside and, starting from a workpiece top side aligned parallel to the underside, a workpiece contour projects upwards in the vertical direction from the workpiece top side. This workpiece contour extends in the direction of the upper tool in such a way that, after the workpiece has been positioned with the bending line intended for the forming process below the lower edge of the upper tool, the second optical safety device arranged in the workpiece receiving space would be blocked, which would lead to the drive for the upper tool being switched off by the safety controller. Accordingly, in order to carry out the machining process on a workpiece shaped in this way, it is necessary to process only the sensor signals from the first optical safety device.

In the second operating mode, a second workpiece configuration is assumed in which the workpiece rests on the workpiece support surface with a bottom side and, starting from a top side of the workpiece that is aligned parallel to the bottom side, a workpiece contour protrudes from the top side of the workpiece in a vertical direction upwards. This workpiece contour extends in the direction of the upper tool in such a way that, after the workpiece has been positioned with the bending line intended for the forming process below the lower edge of the upper tool, the first optical safety device arranged in the handling space would be blocked, which would lead to the drive for the upper tool being switched off by the safety controller. Accordingly, in order to carry out the machining process on a workpiece shaped in this way, it is necessary to process only sensor signals from the second optical safety device.

Advantageous further developments of the invention are the subject of the sub-claims.

It is useful if the first optical safety device has a first lower beam source that is designed to provide a first lower optical beam parallel to the lower edge of the upper tool, and has a first lower beam receiver that is designed to receive the first lower optical beam, and that the first optical safety device has a first upper beam source that is designed to provide a first upper optical beam parallel to the lower edge of the upper tool, and a first upper beam receiver that is designed to receive the first upper optical beam, wherein the first lower beam source is at a smaller distance from the workpiece supporting surface than the first upper beam source. The first lower beam source and the first upper beam source are preferably in each case laser sources, which each output a beam of parallel aligned beams, referred to as the first lower optical beam or as the first upper optical beam, onto the respectively oppositely arranged first lower beam receiver or first upper beam receiver.

The beam sources can preferably be designed to provide beams of a single wavelength or to provide beams in a predetermined wavelength spectrum. It is particularly preferred that the beams are in the wavelength range of visible light and/or in the near infrared or near ultraviolet wavelength ranges. The first lower beam receiver and the first upper beam receiver are each a diode that is sensitive, in particular light-sensitive, to the optical beams provided, or are each an arrangement of a plurality of light-sensitive diodes or a camera chip, in particular a CCD chip.

In one variant of the first optical safety device, it may be provided that a single radiation source supplies a large optical beam which is fanned out into a defined radiation field or into a plurality of smaller beams by means of an optical system. In a further variant of the first optical safety device, it may be provided that the parallel aligned optical beams are received by a common beam receiver, in particular a camera chip, and a discrete evaluation for the individual optical beams and the resulting sensor signals is carried out by the safety controller.

It is preferably provided that the first lower optical beam and the first upper optical beam are arranged in a beam plane that is aligned parallel to the movement plane. It is typically provided that the first lower optical beam is aligned parallel to the bottom edge and to the workpiece support surface and is at a distance of approximately 6 mm to 10 mm from the workpiece support surface and that the first upper optical beam is aligned parallel to the first lower optical beam and is at a distance of about 12 mm to 20 mm from the workpiece support surface.

Optionally, further beam sources and beam receivers can be provided to implement additional protective functions. It is preferred that the second optical safety device has a second lower beam source, which is designed to provide a second lower optical beam parallel to the lower edge of the upper tool, and has a second lower beam receiver, which is designed to receive the second lower optical beam, and that the second optical safety device has a second upper beam source, which is designed to provide a second upper optical beam parallel to the lower edge of the upper tool, and a second upper beam receiver, which is designed to receive the second upper optical beam, the second lower beam source being at a smaller distance from the workpiece supporting surface than the second upper beam source.

It is particularly preferred that the design of the second optical safety device is similar or identical to the design of the first optical safety device and differs from the first optical safety device only in that the second optical safety device is arranged in the workpiece receiving space.

In a further development of the invention, it is envisaged that the safety controller, when operated in the first operating mode, is designed to carry out an evaluation of a sensor signal from the first upper beam receiver and an evaluation of a sensor signal from the first lower beam receiver during a closing movement of the upper tool. During the closing process of the upper tool, in which the upper tool approaches the workpiece support surface, continuous monitoring of the section of the handling space directly in front of the upper tool is provided for in the first operating mode, since there is a risk of the user being crushed in this section during the closing movement of the upper tool.

This applies both to the case where the upper tool is a clamping beam of a folding machine, used to secure the workpiece to the workpiece table prior to the bending process, and to the case where the upper tool is a folding beam of a press brake. Although this risk of crushing is reduced when the distance between the lower edge and the workpiece support surface is below a first handling distance and also when it is below a second handling distance, maintaining the monitoring ensures a consistently high level of safety for the closing process.

As a purely illustrative example, the first handling distance is approx. 12 mm, while the second handling distance is approximately 6 mm. In principle, it is assumed that the upper tool, starting from a maximum distance between the upper tool and the workpiece support surface, is first approached at a high approach speed to the workpiece support surface and that no switchover to a low approach speed occurs even when the first handling distance and the second handling distance are reached.

In a further development of the invention, it is envisaged that the safety controller, when operated in the second operating mode is designed to blank out a sensor signal of the second upper beam receiver when the distance between the lower edge and the workpiece supporting surface falls below a first safety distance and to blank out a sensor signal of the second lower beam receiver when the distance between the lower edge and the workpiece supporting surface falls below a second safety distance. Herewith it is assumed that the second safety distance is smaller than the first safety distance and the first safety distance and the second safety distance describe distances between the lower edge of the upper tool and the workpiece supporting surface.

The same considerations as for the first operating mode apply here, so that reference can be made to the description above for the first operating mode for the second operating mode. To blank out means to mask or ignore the respective sensor signal such that the safety controller does not consider the respective sensor signal.

In particular, it is assumed that the first safety distance is identical to the first handling distance and/or that the second handling distance is identical to the second safety distance. For the second operating mode, it is assumed that the upper tool is first approached at a high approach speed to the workpiece support surface, starting from a maximum distance between the upper tool and the workpiece support surface.

Furthermore, it may be provided that—for example with the aid of a position measuring system associated with the upper tool or an associated first switching mechanism—shortly before reaching the first safety distance, a switchover to a low approach speed occurs. Insofar as the safety controller can determine from a time derivative of sensor signals of the path-measuring system for the determination of the position of the upper tool or by a specified time interval for the arrival of a switching signal of a second switching device, which is assigned to the upper tool at a defined distance from the first switching device, that the low approach speed for the upper tool is maintained shortly before reaching the first safety distance, the sensor signal of the second upper beam receiver can be suppressed.

This is based on the assumption that, at the reduced, low approach speed and with the remaining working gap between the upper tool and the workpiece contact surface, it can be assumed that a user is no longer at risk of reaching into the remaining working gap. Nevertheless, the remaining gap is still monitored by the second lower beam source and the associated second lower beam sensor, which is only deactivated by blanking the sensor signal of the second lower beam receiver when the lower edge is located immediately before reaching the second safety distance.

In addition, the monitoring of the workpiece receiving area provided for in the second operating mode also ensures protection of user intervention that can be carried out laterally past the upper tool, as is particularly the case with clamping beams of folding machines or in the case of upper tools designed as male dies of press brakes, which do not necessarily have to extend over the entire width of the respective bending machine and thus allow lateral access to the workpiece receiving area.

It is preferably provided that the safety controller may be operated in a third operating mode in which an evaluation of the first sensor signals and the second sensor signals is provided. In this third operating mode, the handling area and the workpiece receiving area are monitored simultaneously. This makes it possible for the approach movement of the upper tool to the workpiece contact surface to take place entirely at rapid traverse, without the need to switch to creep speed. Furthermore, this enables the monitoring of user interventions laterally past the upper tool into the workpiece handling area.

For the third operating mode, it is planned that the safety controller will blank the sensor signals of the second upper beam receiver when the distance between the lower edge and the workpiece support surface falls below a first safety distance and will blank the sensor signals of the second lower beam receiver when the distance between the lower edge and the workpiece support surface falls below a second safety distance between the lower edge and the workpiece support surface, the safety controller is designed to blank out the sensor signals of the second upper beam receiver, since these would otherwise be interrupted by the upper tool during the closing movement of the upper tool.

In a further development of the invention, it is envisaged that the first optical safety device and the second optical safety device are arranged in a fixed position on the machine bed. For example, it is envisaged that the first and second lower beam sources and the first and second upper beam sources are arranged on a first side edge, extending transversely to the lower edge, of the workpiece support surface. Furthermore, it can be provided that the first and the second lower beam receiver and the first and the second upper beam receiver are arranged on a second side edge of the workpiece support surface, which extends transversely to the lower edge, and are thus arranged exactly opposite to the respective beam sources.

In a further embodiment of the invention, it is provided that the first optical safety device and the second optical safety device are located linearly movable on the upper tool. It is preferably provided that the first optical safety device and the second optical safety device are both arranged on a carrier linearly movable on the upper tool, wherein the carrier is designed for a linear relative movement along the movement axis with respect to the upper tool. It is particularly preferred that the carrier with the safety devices received thereon is initially located in a first functional position and, even during an approach movement of the upper tool to the workpiece support surface, starting from a maximum distance of the upper tool with respect to the workpiece support surface, initially does not perform any relative movement with respect to the upper tool.

When the upper tool has approached the workpiece support surface in such a way that the optical beams emitted by the first and second lower radiation sources in the direction of the first and second radiation receivers correspond to the second handling distance, a relative movement between the carrier and the upper tool is executed, whereby the carrier is moved from the first functional position to a second functional position. This relative movement ensures that the optical beams emitted by the first and second lower beam sources in the direction of the first and second beam receivers do not approach closer to the workpiece support surface than is specified by the second handling distance, while the upper tool continues with its approach movement.

Preferably, the carrier is biased into the first functional position with a spring against the upper tool and, during the approach movement of the upper tool to the workpiece support surface, strikes a stop associated with the workpiece table, causing an increase in spring tension and allowing the desired relative movement between the upper tool and carrier to take place, in which the carrier is displaced to the second functional position.

During a subsequent removal movement of the upper tool from the workpiece contact surface, the carrier is then lifted off the stop again and returns to its first functional position. It is preferably provided that the safety controller is designed to activate an adjusting device for positioning the first optical safety device and the second optical safety device between the first functional position and the second functional position. This allows an adjustment of the movement behavior between the carrier, with the first and second optical safety devices mounted on it, and the upper tool.

It is advantageous if the upper tool is designed as a workpiece holder for fixing a workpiece to the workpiece table and if a folding beam extending along the front edge of the workpiece support surface is pivotally mounted on the workpiece table, wherein a pivot axis of the folding beam is aligned parallel to the lower edge and to the front edge. In this embodiment of the upper tool, the deformation of the workpiece is carried out by the pivotally movable folding beam, while the upper tool has the task of pressing the workpiece onto the workpiece support surface. A bending machine designed in this way is also referred to as a folding machine.

The problem of the invention is solved according to a second aspect of the invention by a method for operating a bending machine that includes the following steps: carrying out a selection process for a workpiece-dependent operating mode for a safety controller of a bending machine from the group: first operating mode for a workpiece with a lateral upstand behind a bending line, second operating mode for a workpiece with a lateral upstand in front of the bending line; pushing a workpiece in a pushing movement in a pushing-on direction onto a workpiece support surface of the bending machine, wherein a bending line of the workpiece is arranged in a movement plane which is spanned by a lower edge of an upper tool of the bending machine and a movement axis of the upper tool, which upper tool is mounted so as to be linearly movable with respect to the workpiece support surface, activation of a first optical safety device by the safety controller in the event that the first operating mode has been selected, the first optical safety device being arranged in a handling space of the bending machine, which, starting from the upper tool, extends in front of the movement plane in the opposite direction to the pushing-on direction, or activation of a second optical safety device by the safety controller in the event that the second operating mode has been selected, the second optical safety device being arranged in a workpiece receiving space of the bending machine, which, starting from the upper tool, extends in the pushing-on direction behind the movement plane.

The selection process can be carried out either by a manual user input at the bending machine or by evaluating a data set in a machine controller of the bending machine, which has been provided, for example, by a higher-level control system, in particular a programmable logic controller, to the machine controller. The objective of the selection process is to be able to make a specification for the safety controller with regard to the use of sensor signals or the suppression of sensor signals from the first and second optical safety devices.

When the first operating mode is selected, it is assumed that the workpiece has at least one lateral upstand which, when the workpiece is positioned on the workpiece support surface with the location of the bending line to be created on the workpiece in the movement plane of the lower edge, would result in at least the second lower optical beam being interrupted by the upstand during workpiece processing. Since no path-dependent suppression of sensor signals is required for the first operating mode, the use of path signals from a distance measuring device is not necessary. Accordingly, the first operating mode provides for the suppression of the second optical safety device.

In the second operating mode, it is assumed that the workpiece has at least one lateral upstand, which, when the workpiece is positioned on the workpiece support surface with an arrangement of the bending line to be created on the workpiece in the movement plane of the lower edge, would lead to the first lower optical beam being interrupted by the upstand during workpiece processing. Accordingly, when the second operating mode is selected, the first optical safety device is blanked out.

The workpiece is then pushed onto the workpiece support surface in a preferably horizontal sliding movement and arranged with respect to the movement plane, which is defined by the lower edge of the upper tool and the movement axis for the upper tool, such that the bending line lies in the movement plane. The bending line represents the line along which a part of the workpiece is bent with respect to another part of the workpiece during the forming process that is to be carried out with the bending machine.

When the first operating mode is selected, the first optical safety device is then activated to monitor and secure the handling space that faces the user from the upper tool, while the second optical safety device is deactivated in order to avoid an undesired interruption of the machining process, as could occur if the optical beams, in particular the second lower optical beam, of the second optical safety device were interrupted. In the first operating mode, it is preferably provided that no blanking out or deactivation of the first optical safety device is carried out.

The upper tool then approaches the workpiece in order to ensure that the workpiece is fixed to the workpiece table in the case of a bending machine designed as a folding machine. Alternatively, the upper tool then approaches the workpiece and carries out the desired deformation process directly in the case of a bending machine designed as a press brake. During the approach of the upper tool in the direction of the workpiece, the sensor signals of the first and second optical safety devices can be completely blanked out.

If the first lower optical beam or the first upper optical beam of the first optical safety device is interrupted while the upper tool is approaching the workpiece, this is detected by the safety controller on the basis of the sensor signals of the first lower beam receiver or the first upper beam receiver and results in the shutdown of a drive for the upper tool, which is executed by the safety controller.

If the second operating mode is selected, the second optical safety device is then activated, which protects the workpiece receiving area that is facing away from the user when viewed from the upper tool, while the first optical safety device is deactivated or masked in order to avoid an undesired interruption of the machining process, as could occur if the optical beams, in particular the first lower optical beam, of the first optical safety device were interrupted.

The upper tool then approaches the workpiece in order to ensure that the workpiece is fixed to the workpiece table in the case of a bending machine designed as a folding machine. Alternatively, the upper tool then approaches the workpiece and carries out the desired deformation process directly in the case of a bending machine designed as a press brake.

If the second lower optical beam or the second upper optical beam of the second optical safety device is interrupted during the approach of the upper tool to the workpiece, this is detected by the safety controller on the basis of the sensor signals of the second lower beam receiver or the second upper beam receiver and results in a shutdown of a drive for the upper tool, which is executed by the safety controller.

When the distance between the lower edge and the workpiece support surface falls below the first handling distance, the sensor signal of the second upper beam receiver is blanked.

When the distance between the lower edge and the workpiece support surface falls below the first handling distance, the sensor signal of the second lower beam receiver is blanked.

If necessary, the safety controller can trigger a return movement for the upper tool in the first operating mode and/or in the second operating mode, in order to quickly enlarge the gap between the lower edge of the upper tool and the workpiece contact surface again in the event of a safety-related interruption of the machining process for the workpiece, and thus to further reduce the hazard potential from the upper tool.

In a further development of the method, it is envisaged that in the first operating mode, during an approach of the upper tool to the workpiece support surface, when the distance between the lower edge of the upper tool and the workpiece support surface falls below a first safety distance, also referred to as the first handling distance, no suppression of a sensor signal from a first upper beam receiver of the first optical safety device is carried out and that when the distance between the lower edge of the upper tool and the workpiece support surface falls below a second safety distance, which is also referred to as the second handling distance, no suppression of a sensor signal of a first lower beam receiver of the first optical safety device is carried out. In this case, the first safety distance and the second safety distance are dimensioned with purely exemplary 12 mm and 6 mm distance from the workpiece support surface.

In a further development of the method, it is envisaged that in the second operating mode, during an approach of the upper tool to the workpiece support surface, when the distance between the lower edge of the upper tool and the workpiece support surface falls below a first safety distance, also referred to as the first intervention distance, a blanking of a sensor signal from a second upper beam receiver of the second optical safety device is carried out and that when the distance between the lower edge of the upper tool and the workpiece supporting surface falls below a second safety distance, also referred to as the second intervention distance, a sensor signal of a second upper beam receiver of the second optical safety device is blanked out.

These blankings or maskings prevent undesired shutdown of the drive system for the upper tool, with the first safety distance and the second safety distance being dimensioned, purely by way of example, at 12 mm and 6 mm from the workpiece such that at the time of the masking of the respective sensor signal, the reduction in the hazard potential arising from the approach movement of the upper tool to the workpiece support surface and to the workpiece resting thereon is ensured.

In a favorable further development of the method, it is envisaged that when the selection process for the workpiece-dependent operating mode of the safety controller of the bending machine is carried out, a third operating mode is provided for a workpiece without lateral upstands, and that when the third operating mode is selected, the first protective device and the second protective device are activated by the safety controller, and during an approach of the upper tool to the workpiece support surface, when a first safety distance between the lower edge of the upper tool and the workpiece support surface, a second sensor signal of a second upper beam receiver of the second optical safety device is blanked out, and that when the distance falls below a second safety distance between the lower edge of the upper tool and the workpiece support surface, a sensor signal of a second lower beam receiver of the second optical safety device is blanked out.

The third operating mode is provided for the case that the workpiece has no contours protruding from a top side of the workpiece aligned parallel to the workpiece supporting surface, which would lead to an undesired interruption of the optical beams of the first and second optical safety devices. In the third operating mode, it may be provided in particular that the approach of the upper tool to the workpiece supporting surface is carried out in rapid traverse without a switchover to the creep speed. For a complete approach of the upper tool to the workpiece supporting surface in rapid traverse, it is advantageous if no path-dependent blanking of the sensor signals of the first optical safety device is carried out.

BRIEF DESCRIPTION OF DRAWINGS

An advantageous embodiment of the invention is shown in the drawing.

Here shows.

DETAILED DESCRIPTION

Figure 1:
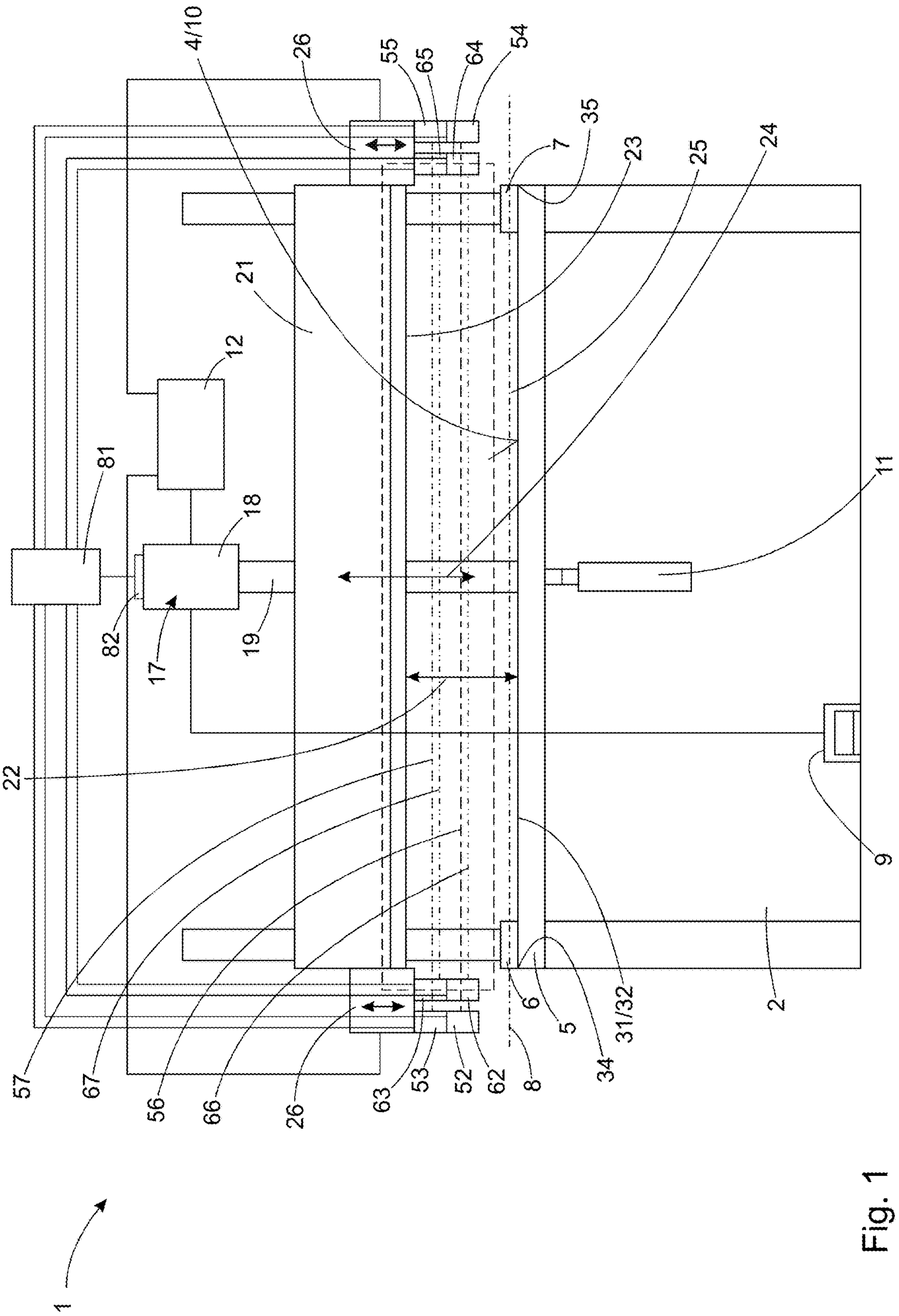
FIG. 1: a front view of a bending machine, designed purely as an example as a folding machine, which is equipped with a first optical safety device and with a second optical safety device, as well as an associated safety controller.
Figure 2:
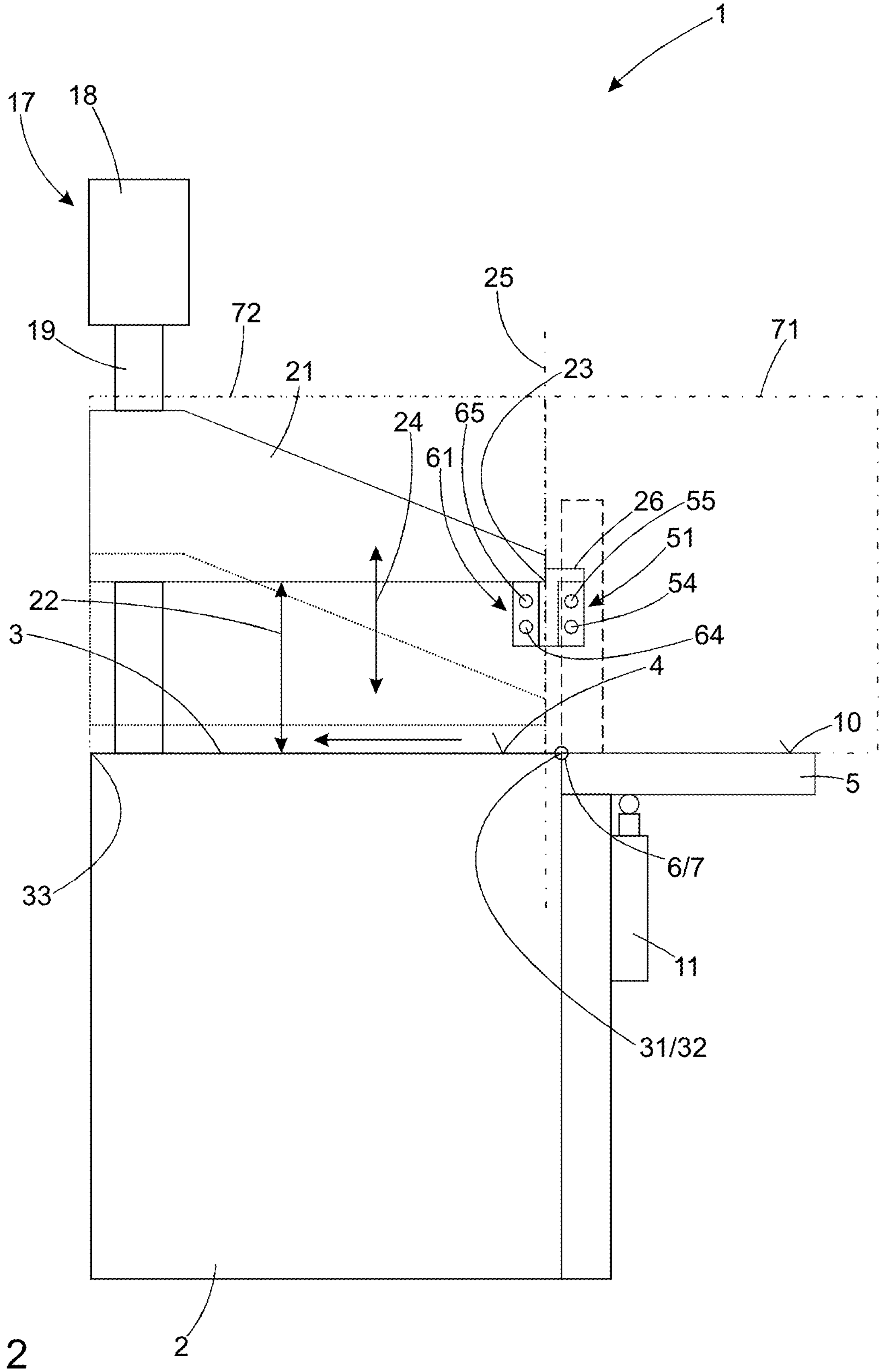
FIG. 2: a schematic, partially cut side view of the bending machine according to FIG. 1, FIG. 3: a schematic, partially cut side view of a variant of the bending machine according to FIG. 1, in which the first optical safety device and the second optical safety device are arranged in a fixed position on the machine frame.

A bending machine 1 shown in FIGS. 1 and 2, designed purely as an example as a folding machine, comprises a machine bed 2 on which a workpiece table 3 is formed, which comprises a workpiece support surface 4 that is exemplarily formed to be flat.

As shown in FIGS. 1 and 2, the workpiece support surface 4, which is rectangular purely by way of example, is horizontally aligned and extends from a front edge 32 visible in FIG. 1 to a rear edge 33 visible in FIG. 2. Furthermore, the workpiece supporting surface 4 extends from a left side edge 34 to a right side edge 35.

Furthermore, a bending beam 5, also named folding beam, is arranged on the machine bed 2 so as to be pivotally movable, which bending beam 5 extends with a longest edge 31 along the front edge 32 of the workpiece supporting surface 4. The bending beam 5 is attached to the machine bed 1 by means of a pivot joint 6, 7 at each of its opposite end regions. The pivot joints 6, 7 have a common pivot axis 8 that is aligned parallel to the workpiece support surface 4.

Figure 4:
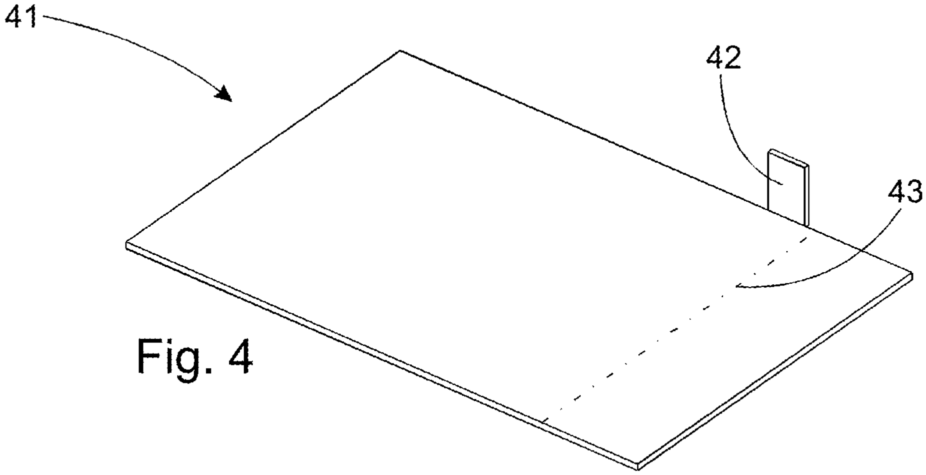
FIG. 4: a schematic representation of a workpiece that is provided with an upstand behind a bending line, and FIG. 5 a schematic representation of a workpiece that is provided with an upstand in front of a bending line.

A working surface 10 of the bending beam 5 can be pivoted by means of a pivoting drive 31 by a pivoting movement of the bending beam 5 out of the rest position shown in FIGS. 1 and 4, in which the working surface 10 is arranged parallel and flush with the workpiece support surface 4, into an operating position shown in FIG. 2 with a dashed line. In the operating position, the work surface 10, for example, assumes a right angle with respect to the workpiece support surface 4, but other angular positions are also possible.

Figure 3:
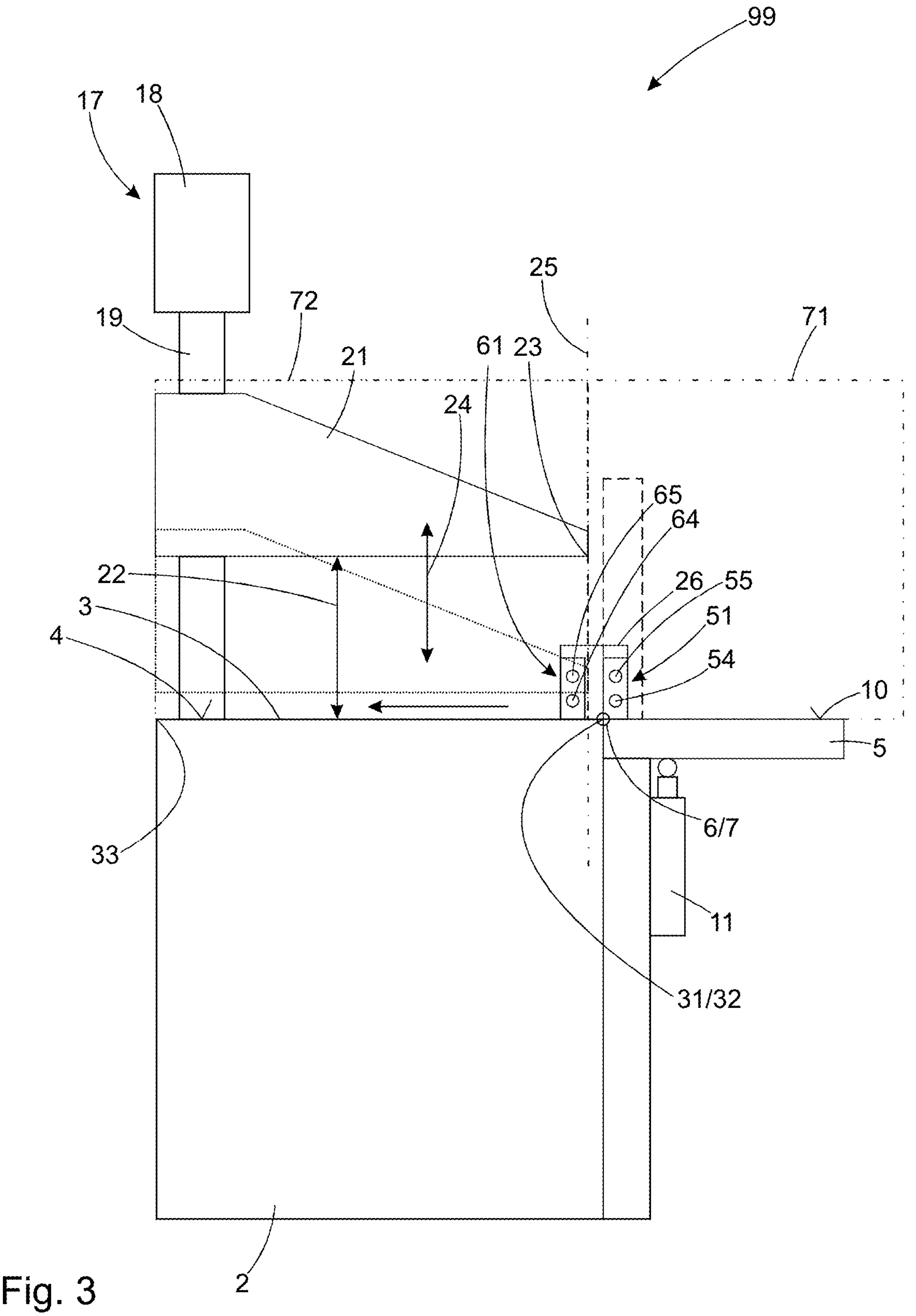

The pivoting movement of the folding beam 5 is initiated by a foot switch 9, which is connected to a machine controller 12 that can control or regulate the movement of the pivoting drive 31. To fix a workpiece 41 or 47, as shown in FIGS. 3 and 4, to the workpiece table 3, an upper tool 21 is provided, which is movably attached to the machine bed 2 and is also referred to as a clamping beam.

The upper tool 21 is linearly guided on both sides by guide columns 15, 16, which in turn are fixed to the machine bed 2. A distance 22 between a lower edge 23 of the upper tool 21 and the workpiece table 3 can be adjusted by means of a spindle drive 17, which comprises an electric motor 18 and a drive spindle 19.

A movement of the upper tool 21 between a first operating position, as shown in FIG. 1, with a maximum distance 11 from the workpiece support surface 4 and a second operating position with a minimum distance 22 from the workpiece support surface 4 can thus be carried out along a movement axis 24, drawn as a double arrow. In this case, the lower edge 23 of the upper tool 21 moves between the first functional position and the second functional position in a movement plane 25, which is drawn in a dashed line in FIGS. 1 and 2, which movement plane 25 is aligned transversely to the workpiece support surface 4 and geometrically contains the lower edge 23.

The upper tool 21 is assigned a first optical safety device 51 and a second optical safety device 61. The first optical safety device 51 comprises a first lower beam source 52, a first upper beam source 53, a first lower beam receiver 54 and a first beam receiver 55. The second optical safety device 61 comprises a second lower beam source 62, a second upper beam source 63, a second lower beam receiver 64 and a second upper beam receiver 65.

Between the respective optical beam sources 52, 53 and 62, 63 and the associated optical beam receivers 54, 55 and 64, 65, first lower laser beams 56, first upper laser beams 57, second lower laser beams 66 and second upper laser beams 67 are provided respectively, as indicated by the different broken lines.

In order to be able to show all laser beams 56, 57, 66, 67 in FIG. 1, they are drawn at different distances from the workpiece support surface 4. In practice, however, it may be intended that the respective lower laser beams 56, 66 are arranged in a common horizontal plane, in particular in a plane oriented parallel to the workpiece support surface 4, and/or the respective upper laser beams 57, 67 are arranged in a common horizontal plane, in particular in a plane oriented parallel to the workpiece support surface 4, as can also be seen from FIG. 2.

The beam sources 52, 53, 62, 63 may, for example, be designed as discrete laser diodes and are preferably configured in such a way that the respective laser beams 56, 57, 66, 67 are emitted in the form of parallel beams with an almost punctiform cross-section.

As examples, the beam receivers 54, 55, 64, 65 are aligned in such a way that the respective laser beams 56, 57, 66, 67 each strike areas of the respective beam receivers 54, 55, 64, 65 that have maximum optical sensitivity.

Both optical safety devices 51 and 61 are each attached to holding devices 26, which in turn are linearly movably arranged on the upper tool 21 and allow a linear relative movement of the optical safety devices 51 and 61 along the movement axis 24 relative to the upper tool 21. In this case, it is envisaged that the linear movements of the holding devices 26 relative to the upper tool 21 are coordinated by the machine controller 12 in such a way that the respective radiation sources 52, 53, 62, 63 and the associated radiation receivers 50, 55, 64, 65 are always located opposite one another.

The safety controller 81 is electrically connected to the optical safety devices 51 and 61 via electric sensor lines and is designed to process sensor signals from the beam receivers 54, 55, 64, 65 and to activate a shutdown device 82, if necessary. The shut-off device 82 may, for example, be an electric contactor or switch for the electric motor 18.

This enables the safety controller 81 to shut down the drive motor 18 by interrupting the power supply even though the machine controller 12 provides electrical energy to the electric motor 18.

From the side view according to FIG. 2, only the beam receivers 54, 55, 64, 65 can be seen, while the respectively associated beam sources 52, 53, 62, 63 are not shown in FIG. 2. In FIG. 2, the movement plane 25 is drawn as a vertical plane and encompasses the lower edge 23 of the upper tool 21 both in the first functional position, in which the distance 22 between the upper tool 21 and the workpiece contact surface 4 is at a maximum, and in the second functional position, in which the upper tool 21 is only shown as a dashed line.

Furthermore, it can be seen from FIG. 2 that the first lower beam receiver 54 and the first upper beam receiver 55 are arranged in a handling space 71 adjacent to the movement plane 25. The handling space 71 extends from the movement plane 25 in the direction of the front edge 32 of the workpiece support surface 4 and beyond, the handling space 71 thus extending in the opposite direction to the pushing-on direction 91, which is used when pushing one of the workpieces 41 or 47 into the bending machine 1.

The handling area represents the spatial area in which a user handles workpieces and from where, for example, the workpieces 41, 47 are pushed into the bending machine 1 in the pushing direction 91 or are removed from the bending machine 1 in the direction opposite to the pushing direction 91 after the forming operation has been carried out.

The second lower beam receiver 64 and the second upper beam receiver 65, on the other hand, are accommodated in a workpiece receiving space 72 which, starting from the movement plane 25, extends in the direction of the rear edge 33 of the workpiece supporting surface 4 and thus in the pushing-on direction 91.

When the upper tool 21, with the optical safety devices 51, 61 mounted on it, moves from the first functional position to the second functional position, it is initially intended that the holding devices 26 do not move relative to the upper tool 21. However, as soon as the lower laser beams 56, 66 approach a safety distance, which may be 6 mm from the workpiece contact surface 4, for example, the safety controller 81 triggers the drives of the holding device 26, so that the safety distance of the lower laser beams 56, 66 is kept constant despite a further movement of the upper tool 21.

Depending on the selected operating mode for the bending machine 1, either only the sensor signals of the first optical safety device 51 or only the sensor signals of the second optical safety device 61 or the sensor signals of both optical safety devices 51, 61 are processed by the safety controller 81 during this approach movement. If, for example, a workpiece 41, which is only shown schematically in FIG. 4, is to be processed, which has a lateral upstand 42 that has to be arranged parallel to a bending line 43 and which is located in the workpiece receiving space 72 of the bending machine 1, the first operating mode for the bending machine 1 is selected, in which only the sensor signals of the first optical safety device 51 are processed.

Figure 5:
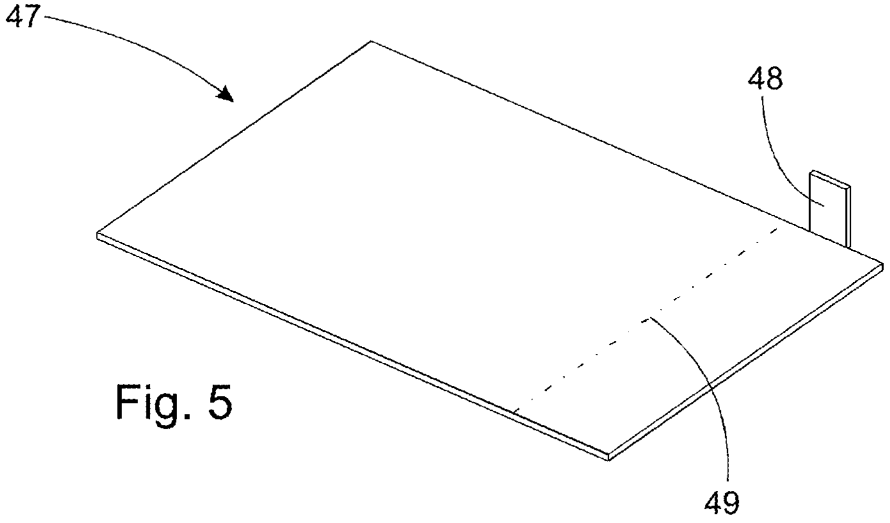

In the first operating mode, it is intended that the sensor signals of the first optical safety device 51 are not blanked out during the entire closing process for the upper tool. If, on the other hand, a workpiece 47 is to be processed, which is only shown schematically in FIG. 5, and which has a lateral upstand 48 that has to be arranged parallel to a bending line 49 and which is located in the handling space 71 of the bending machine 1, the second operating mode is selected for the bending machine 1, in which only the sensor signals of the second optical safety device 61 are processed. In the second operating mode, it is preferably envisaged that, during the closing process for the upper tool, a path-dependent suppression of the sensor signals of the second optical safety device 61 is carried out.

The variant of a bending machine 99 shown in FIG. 3 differs from the variant of the bending machine 1 shown in FIGS. 1 and 2 only in the arrangement of the two optical safety devices 51 and 51, which in this variant are arranged in a fixed position on the machine bed 2. Otherwise, the components of the bending machine 99 are designed in the same way as for the bending machine 1, so that the same reference signs are used for the components and a new description of the components and their function is dispensed with.

The invention claimed is:

1. A bending machine having a machine bed with a workpiece table which has a workpiece supporting surface, and with an upper tool mounted on the machine bed for linear movement along a movement axis, which upper tool has a lower edge arranged adjacent to the workpiece support surface, the lower edge and the movement axis defining a movement plane in which the lower edge can move between an open position for the upper tool and a closed position for the upper tool, the movement plane separating a handling space, which extends from the upper tool in the direction of a front edge of the workpiece support surface, from a workpiece receiving space, which extends from the upper tool to a rear edge of the workpiece support surface support surface and wherein a first optical safety device is arranged in the handling space and a second optical safety device is arranged in the workpiece receiving space, and with a safety controller which processes first sensor signals of the first optical safety device and second sensor signals of the second optical safety device and is set up for switching off a drive associated with the upper tool dependent on the first sensor signals and/or dependent on the second sensor signals, wherein the safety controller is switchable between a first operating mode, in which only the first sensor signals are processed, and a second operating mode, in which only the second sensor signals are processed, and wherein the upper tool is a workpiece holder for securing a workpiece to the workpiece table, and wherein a folding beam extending along the front edge of the workpiece supporting surface is attached to the workpiece table such that it can pivot, with a pivot axis of the folding beam being aligned parallel to the lower edge of the upper tool and to the front edge of the workpiece supporting surface.

2. The bending machine according to claim 1, wherein the first optical safety device has a first lower beam source that provides a first lower optical beam parallel to the lower edge and which has a first lower beam receiver that receives the first lower optical beam, and that the first optical safety device has a first upper beam source that provides a first upper optical beam parallel to the lower edge, and a first upper beam receiver that receives the first upper optical beam, wherein the first lower beam source is located at a smaller distance from the workpiece supporting surface than the first upper beam source.

3. The bending machine according to claim 1, wherein the second optical safety device has a second lower beam source that provides a second lower optical beam parallel to the lower edge, and a second lower beam receiver that receives the second lower optical beam, and that the second optical safety device has a second upper beam source that provides a second upper optical beam parallel to the lower edge and a second upper beam receiver that receives the second upper optical beam, wherein the second lower beam source is located at a smaller distance from the workpiece supporting surface than the second upper beam source.

4. The bending machine according to claim 2, wherein the safety controller exclusively processes sensor signals of the first upper beam receiver and sensor signals of the first lower beam receiver in the first operating mode during a closing movement of the upper tool.

5. The bending machine according to claim 3, wherein the safety controller, when operating in the second operating mode, suppresses sensor signals of the second upper beam receiver when a distance between the lower edge and the workpiece support surface is smaller than a first safety distance, and suppresses sensor signals of the second lower beam receiver when a distance between the lower edge and the workpiece support surface is smaller than a second safety distance.

6. The bending machine according to claim 2, wherein a third operation mode for the safety controller may be selected, in which a processing of the first sensor signals and of the second sensor signals is provided.

7. The bending machine according to claim 6, wherein the safety controller, when operating in the third operating mode, suppresses sensor signals of the second upper beam receiver when a distance between the lower edge and the workpiece support surface is smaller than a first safety distance, and suppresses sensor signals of the second lower beam receiver when a distance between the lower edge and the workpiece support surface is smaller than a second safety distance.

8. The bending machine according to claim 1, wherein the first optical safety device and the second optical safety device are arranged in a fixed position on the machine bed.

9. The bending machine according to claim 1, wherein the first optical safety device and the second optical safety device are arranged on the upper tool such that they can be moved linearly.

10. A method for operating a bending machine comprising the steps of: carrying out a selection process for a workpiece-dependent operating mode for a safety controller of a bending machine from the group: first operating mode for a workpiece having a lateral upstand behind a bending line, second operating mode for a workpiece having a lateral upstand in front of the bending line; pushing a workpiece in a pushing movement in a pushing direction onto a workpiece supporting surface of the bending machine, wherein a bending line of the workpiece is arranged in a movement plane which is spanned by a lower edge of an upper tool of the bending machine and a movement axis of the upper tool, which upper tool is linearly movable with respect to the workpiece support surface; activation of a first optical safety device by the safety controller in the event that the first operating mode has been selected, the first optical safety device being arranged in a handling space of the bending machine, which handling space extends in front of the movement plane starting from the upper tool in the opposite direction to the pushing-on direction, or activation of a second optical safety device by the safety controller in the event that the second operating mode has been selected, the second optical safety device being arranged in a workpiece receiving space of the bending machine, which workpiece receiving space extends behind the movement plane in the pushing-on direction starting from the upper tool, wherein the upper tool is a workpiece holder for securing a workpiece to the workpiece table, and wherein a folding beam extending along a front edge of the workpiece supporting surface is attached to the workpiece table such that it can pivot, with a pivot axis of the folding beam being aligned parallel to the lower edge of the upper tool and to the front edge of the workpiece supporting surface.

11. The method according to claim 10, wherein in the first mode of operation, during an approach of the upper tool to the workpiece supporting surface the safety controller continues a processing of sensor signals of the first upper beam receiver when a distance between the lower edge and the workpiece support surface is smaller than a first safety distance, and continues a processing of sensor signals of the first lower beam receiver when a distance between the lower edge and the workpiece support surface is smaller than a second safety distance.

12. The method according to claim 10, wherein in the second operating mode, during an approach of the upper tool to the workpiece supporting surface the safety controller processes sensor signals of the second upper beam receiver of the second optical safety device only until a distance between the lower edge and the workpiece support surface is smaller than a first safety distance, and processes sensor signals of the second lower beam receiver of the second optical safety device only until a distance between the lower edge and the workpiece support surface is smaller than a second safety distance.

13. The method according to claim 10, wherein, when the selection procedure for the workpiece-dependent operating mode of the safety controller of the bending machine is carried out, a third operating mode for a workpiece without lateral upturns is provided and upon selection of the third operating mode the first safety device and the second safety device are activated by the safety controller and during an approach of the upper tool to the workpiece support surface the safety controller suppresses sensor signals of the second upper beam receiver when a distance between the lower edge and the workpiece support surface is smaller than a first safety distance, and suppresses sensor signals of the second lower beam receiver when a distance between the lower edge and the workpiece support surface is smaller than a second safety distance.

* * * * *